US012613658B2

(12) United States Patent
Segev et al.

(10) Patent No.: US 12,613,658 B2
(45) Date of Patent: Apr. 28, 2026

(54) EARLY READ START TIME FOR RANDOM ACCESS SSDs

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/443,975

(22) Filed: Feb. 16, 2024

(65) Prior Publication Data

US 2025/0265014 A1 Aug. 21, 2025

(51) Int. Cl.
G06F 3/06 (2006.01)

(52) U.S. Cl.
CPC .......... G06F 3/0659 (2013.01); G06F 3/0623 (2013.01); G06F 3/0673 (2013.01)

(58) Field of Classification Search
None
See application file for complete search history.

(56) References Cited

U.S. PATENT DOCUMENTS

| 6,044,429 A | * | 3/2000 | Ryan | ................... | G11C 11/4082 |
| | | | | | 710/305 |
| 8,938,583 B1 | * | 1/2015 | Suryabudi | ........... | G06F 12/0246 |
| | | | | | 711/170 |

| 10,025,531 B2 | | 7/2018 | Yoon et al. | | |
| 10,282,250 B1 | * | 5/2019 | Banerjee | ............... | G06F 3/0659 |
| 10,521,383 B1 | * | 12/2019 | Adams | ................ | G06F 13/1631 |
| 10,936,496 B2 | | 3/2021 | Simionescu et al. | | |
| 11,042,481 B1 | * | 6/2021 | Virani | ................. | G06F 9/30047 |
| 11,481,348 B2 | | 10/2022 | Adams et al. | | |
| 11,675,701 B2 | * | 6/2023 | Li | ........................ | G06F 12/0815 |
| | | | | | 711/141 |
| 2003/0167386 A1 | * | 9/2003 | Kuo | .................... | G06F 13/1631 |
| | | | | | 711/210 |
| 2006/0106993 A1 | * | 5/2006 | Khare | ................. | G06F 12/0831 |
| | | | | | 711/143 |
| 2015/0293709 A1 | * | 10/2015 | Quach | ................. | G06F 13/1626 |
| | | | | | 711/105 |

(Continued)

*Primary Examiner* — Yaima Rigol
(74) *Attorney, Agent, or Firm* — Patterson + Sheridan, LLP

(57) ABSTRACT

Instead of waiting for a write command to complete, a coherency table in a solid state drive (SSD) will expedite the read command start time. The coherency table allows a response to the write command will be sent to the host as soon as a write command is received. The coherency table will continue to process the write command through to the encryption/decryption (XTS) module and then over to the DRAM as normal. Once the read command reaches the coherency table, the command will be assessed for any issues. If there is an issue detected, then the coherency table will delay the read command until the previous write command reaches the DRAM (after going through the XTS module). Once the data from the write command reaches the DRAM the coherency table is cleared, and the read command is no longer delayed. The data can now be read from DRAM, decrypted in the XTS module and sent back to the host. Data is encrypted due to the write command before being sent to the DRAM. The data is decrypted due to the read command being read from the DRAM.

11 Claims, 8 Drawing Sheets

(56) References Cited

U.S. PATENT DOCUMENTS

| | | | | |
|---|---|---|---|---|
| 2017/0075570 A1* | 3/2017 | Yoon | ..................... | G06F 3/0679 |
| 2018/0018101 A1* | 1/2018 | Benisty | ................ | G06F 3/0659 |
| 2021/0278976 A1* | 9/2021 | Li | ......................... | G06F 3/0619 |
| 2022/0207193 A1* | 6/2022 | Caraccio | ................ | G06F 21/79 |
| 2022/0283713 A1 | 9/2022 | Li et al. | | |
| 2023/0067236 A1 | 3/2023 | Benisty et al. | | |

* cited by examiner

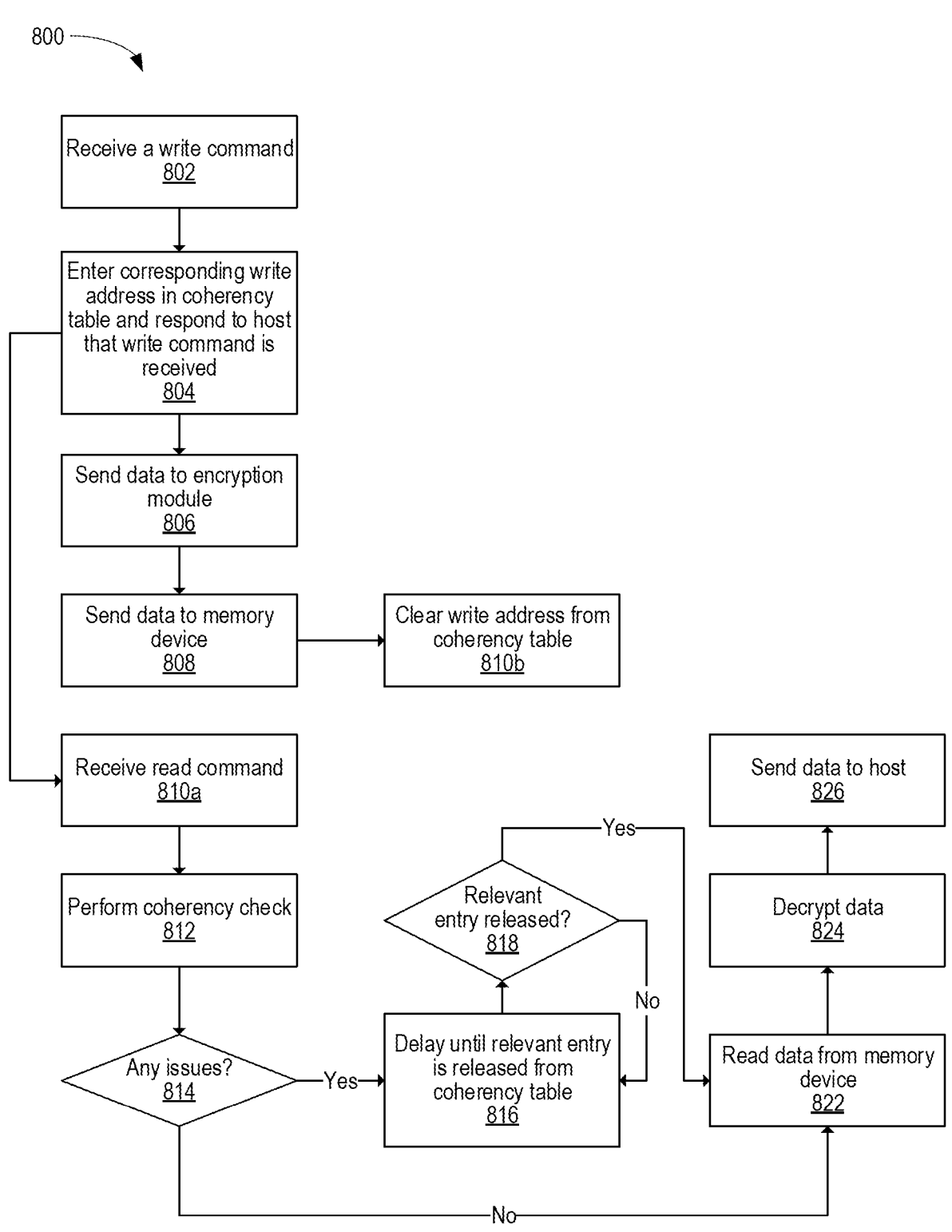

800

Receive a write command
802

Enter corresponding write address in coherency table and respond to host that write command is received
804

Send data to encryption module
806

Send data to memory device
808

Clear write address from coherency table
810b

Receive read command
810a

Perform coherency check
812

Any issues?
814

Relevant entry released?
818

Delay until relevant entry is released from coherency table
816

Send data to host
826

Decrypt data
824

Read data from memory device
822

Yes

No

Yes

EARLY READ START TIME FOR RANDOM ACCESS SSDs

BACKGROUND OF THE DISCLOSURE

Field of the Disclosure

Embodiments of the present disclosure generally relate to improving command performance time in solid state drives (SSD).

Description of the Related Art

SSDs and Non-Volatile Memory express (NVMe) devices, use a logical block address (LBA) (4 KBytes) to pass information between the host and the NAND. However, due to a number of drivers (e.g., control memory buffer (CMB), boot, cache coherent interconnect for accelerators (CCIX), etc . . . ) there is a growing demand for smaller "random access" transactions.

Unlike normal NVMe-SSD devices where coherency is kept in a multiple of LBAs (i.e. 16 KB) depending on the NAND page size, in CCIX (and others) coherency is required by 128 bytes or 64 bytes. To support the low latency requirement, the CCIX (or other hot data) is kept in the controller DRAM, instead of in the memory device (e.g., NAND).

There is a need in the art for improving performance of write and read commands while maintain coherency requirements.

SUMMARY OF THE DISCLOSURE

Instead of waiting for a write command to complete, a coherency table in a solid state drive (SSD) will expedite the read command start time. The coherency table allows a response to the write command will be sent to the host as soon as a write command is received. The coherency table will continue to process the write command through to the encryption/decryption (XTS) module and then over to the DRAM as normal. Once the read command reaches the coherency table, the command will be assessed for any issues. If there is an issue detected, then the coherency table will delay the read command until the previous write command reaches the DRAM (after going through the XTS encrypt engine or module). Once the data from the write command reaches the DRAM the coherency table is cleared, and the read command is no longer delayed. The data can now be read from DRAM, decrypted in the XTS engine/module and sent back to the host.

In one embodiment, a data storage device comprises: a memory device; and a controller coupled to the memory device, wherein the controller is configured to: receive a write command to write data to the memory device; pass the write command to a coherency table; receive a read command for different data; pass the read command to the memory device; and clear a relevant write address from the coherency table, wherein the clearing occurs after the passing the read command, due to writing the write data to DRAM.

In another embodiment, a data storage device comprises: a memory device; and a controller coupled to the memory device, wherein the controller is configured to: receive a write command to write data to the memory device; receive a read command for a same data; delay the read command at a coherency table; clear a relevant write address from the coherency table; and pass the read command to the memory device, wherein the passing occurs after the clearing.

In another embodiment, a data storage device comprises: means to store data; and a controller coupled to the means to store data, wherein the controller is configured to: receive a write command for data to be written to the means to store data; receive a read command for the data; add an entry to a coherency table for the write command; wait for there to be no collision at the coherency table; and execute the read command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 8 is a flowchart illustrating a method for processing a command utilizing a coherency table, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of waiting for a write command to complete, a coherency table in a solid state drive (SSD) will expedite the read command start time. The coherency table allows a response to the write command to be sent to the host as soon as a write command is received. The coherency table will continue to process the write command through to the encryption/decryption (XTS) module and then over to the DRAM as normal. Once the read command reaches the coherency table, the command will be assessed for any issues. If there is an issue detected, then the coherency table will delay the read command until the previous write command reaches the DRAM (after going through the XTS module). Once the data from the write command reaches the DRAM the coherency table is cleared, and the read command is no longer delayed. The data can now be read from DRAM, decrypted in the XTS module and sent back to the host. Data is encrypted due to the write command before being sent to the DRAM. In general, data is encrypted due to a write before going into the DRAM. It is decrypted due to a read after reading from the DRAM.

Figure 1:
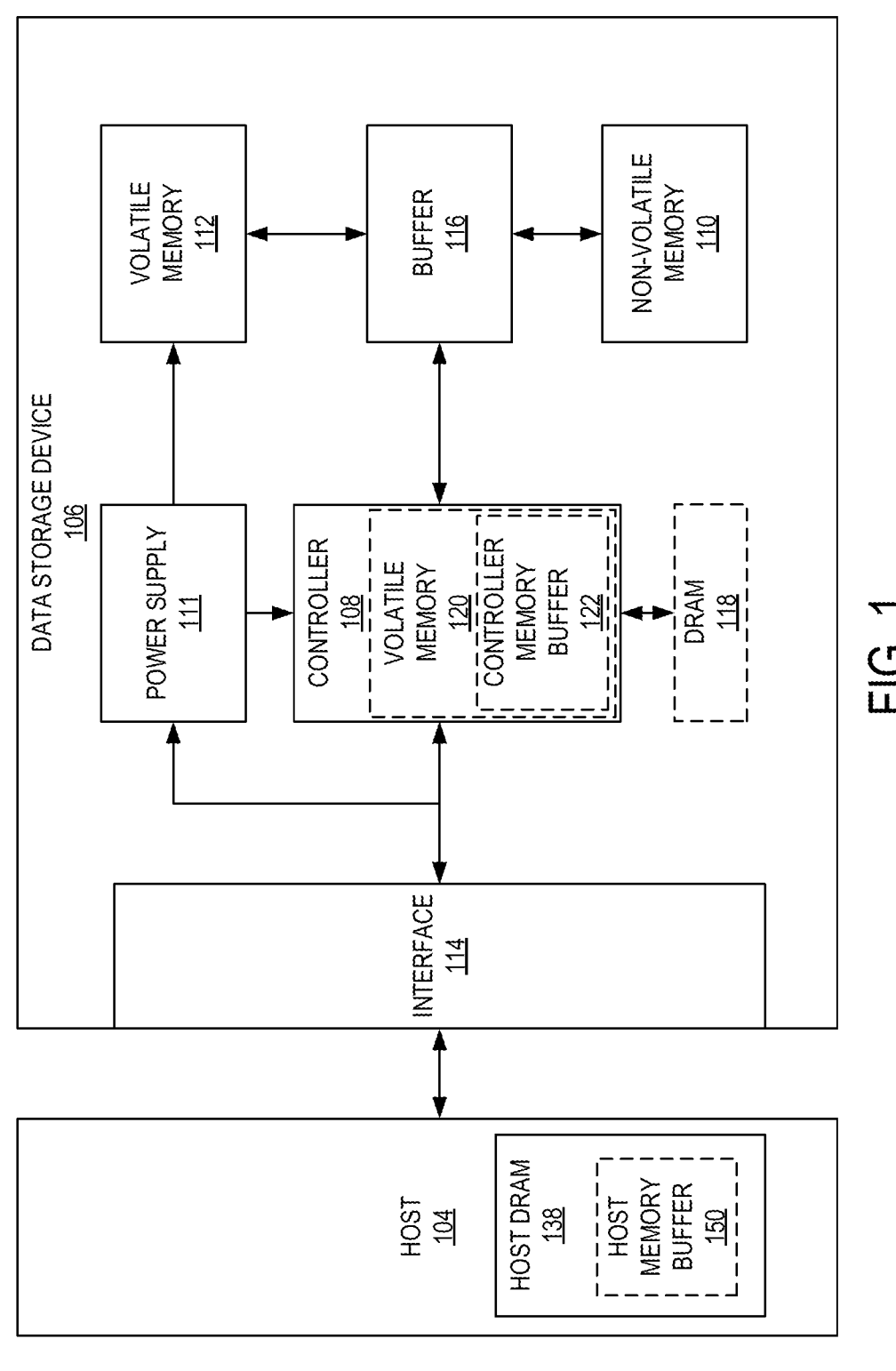
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
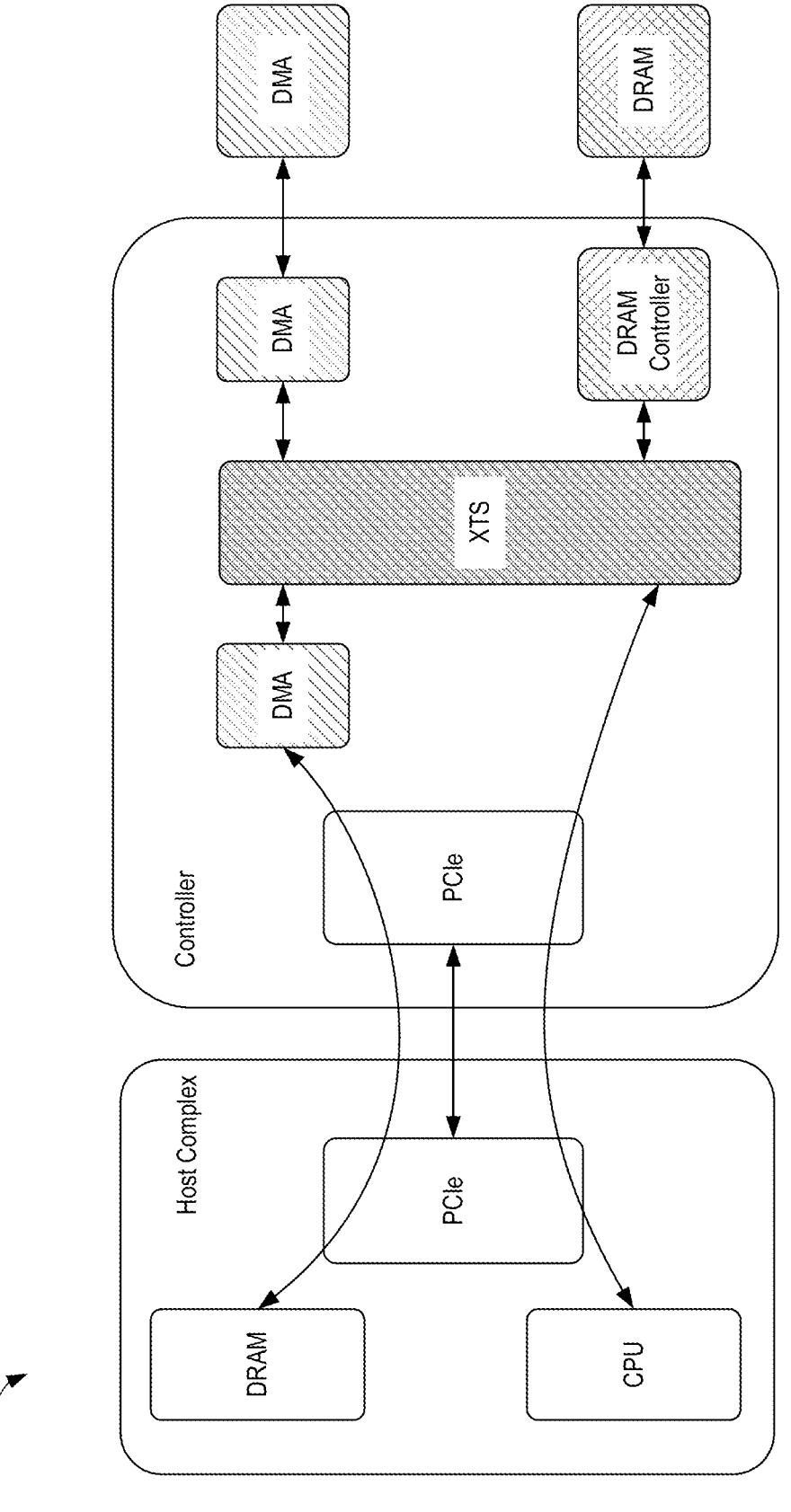
FIG. 2 is a block diagram illustrating a system supporting both user data and CCIX, according to one embodiment.

FIG. 2 is a block diagram illustrating a system 200 supporting both user data and CCIX, according to one embodiment. The host complex side comprises a DRAM, a PCIe bus, and a CPU. The controller comprises a PCIe bus, a direct memory access (DMA) module, an encryption/decryption (XTS) module, a flash interface module (FIM), and a DRAM controller. The system 200 further comprises a NAND and a DRAM different from the DRAM in the host complex. IO commands are serviced by the controller DMA, and the results are stored in the NAND by the FIM. However, the CCIX/BOOT/Control-info is managed directly by the host and is stored in the DRAM. In both cases the data goes through XTS module to protect the host data (IO or control). To support low latency, the CCIX (or other host data) is kept in the controller DRAM, instead of the NAND.

Coherency issues are tackled at the PCIe-level using what is essentially non-posted writes. This allows the host to wait until writes are completed, before the host sends reads. First the host writes (non-posted writes). The data storage device then receives the data. The data storage device encrypts the data in the XTS module. The data storage device passes the data to DRAM controller. The DRAM controller writes the data to the DRAM. The data storage device responds to the host, and the host can now issue reads.

Figure 3:
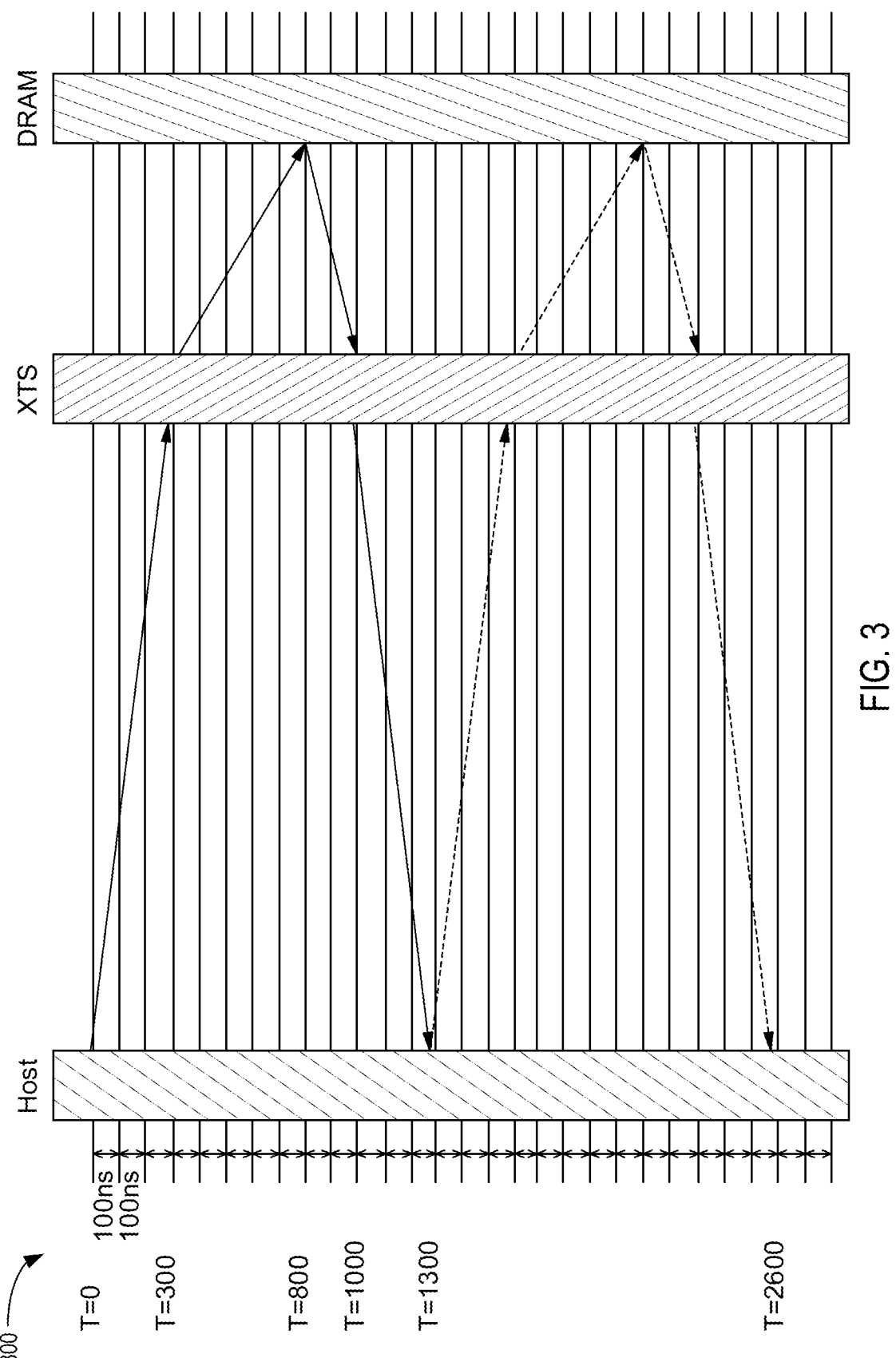
FIG. 3 is a block diagram illustrating a system for coherency maintenance solution, according to certain embodiments.

FIG. 3 is a block diagram illustrating a system 300 for coherency maintenance solution, according to certain embodiments. The delay between the host write until the host can issue new reads is impacting performance. The time numbers shown in FIG. 3 are examples, and there might be other delays which are not covered in FIG. 3. The system 300 is separated in 100 ns increments. The start of the write command, represented by a solid line, which moves across the PCIe in 300 ns. The XTS module takes 500 ns to encrypt the data. The DRAM controller writes the data to DRAM in 200 ns and a response is sent back to the host in 300 ns. The entire flow takes 1300 ns to complete. Only after 1300 ns the host can perform a read, represented in a dashed line, which also takes 1300 ns to complete. The total time to read and write the command takes a total of 2600 ns. As will be discussed herein, reducing the performance impact, while keeping coherency, is obtained.

Holding a small overlap table between reads and writes, the data storage device can respond to a host non-posted write as soon as the entry is in the overlap table. The data storage device will back-pressure overlap reads when a coherency error is reported.

Figure 4:
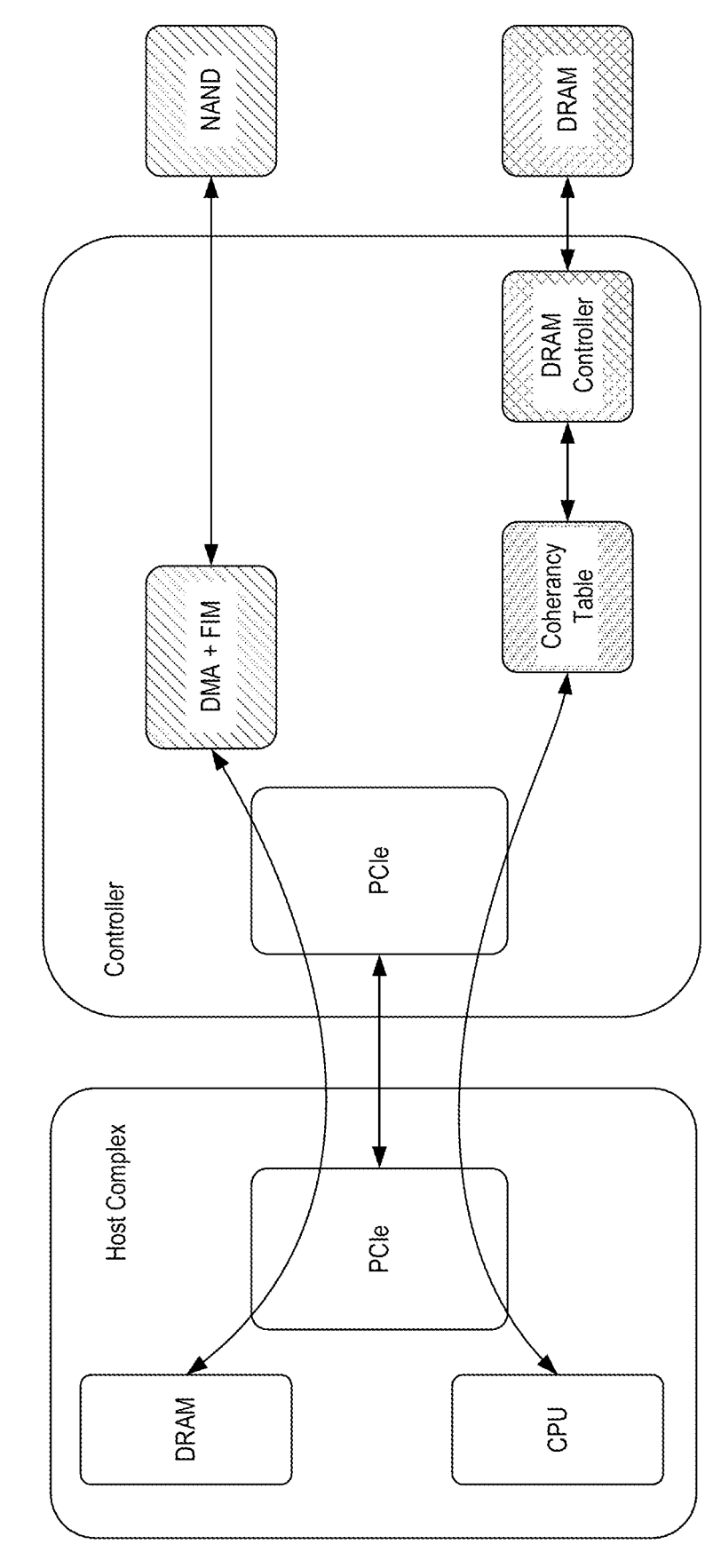
FIG. 4 is a block diagram illustrating a system running a completion flow utilizing a coherency table, according to one embodiment.

FIG. 4 is a block diagram illustrating a system 400 running a completion flow utilizing a coherency table, according to one embodiment. The host complex side comprises a DRAM, a PCIe bus, and a CPU. The controller comprises a PCIe bus, a DMA/FIM, a DRAM controller, and a coherency table. The coherency table is added to the DRAM path. Using the coherency table, a response to the write can be sent earlier, and the read command can start sooner. The coherency table increases performance of the system 400. The system 400 further comprises a memory device (e.g., NAND) and a DRAM different from the DRAM in the host complex. IO commands are serviced by the controller DMA, and the results are stored in the NAND by the DMA/FIM.

Coherency issues are tackled at the PCIe-level using what is essentially non-posted writes. This allows the host to wait until writes are completed, before the host sends reads. First the host writes (non-posted writes). The device then receives the data. The device passes the data from the coherency table through the XTS engine and to the DRAM controller. The DRAM controller writes the data to the DRAM. A response is sent to the host as soon as address (data) is logged in the coherency table.

Figure 5:
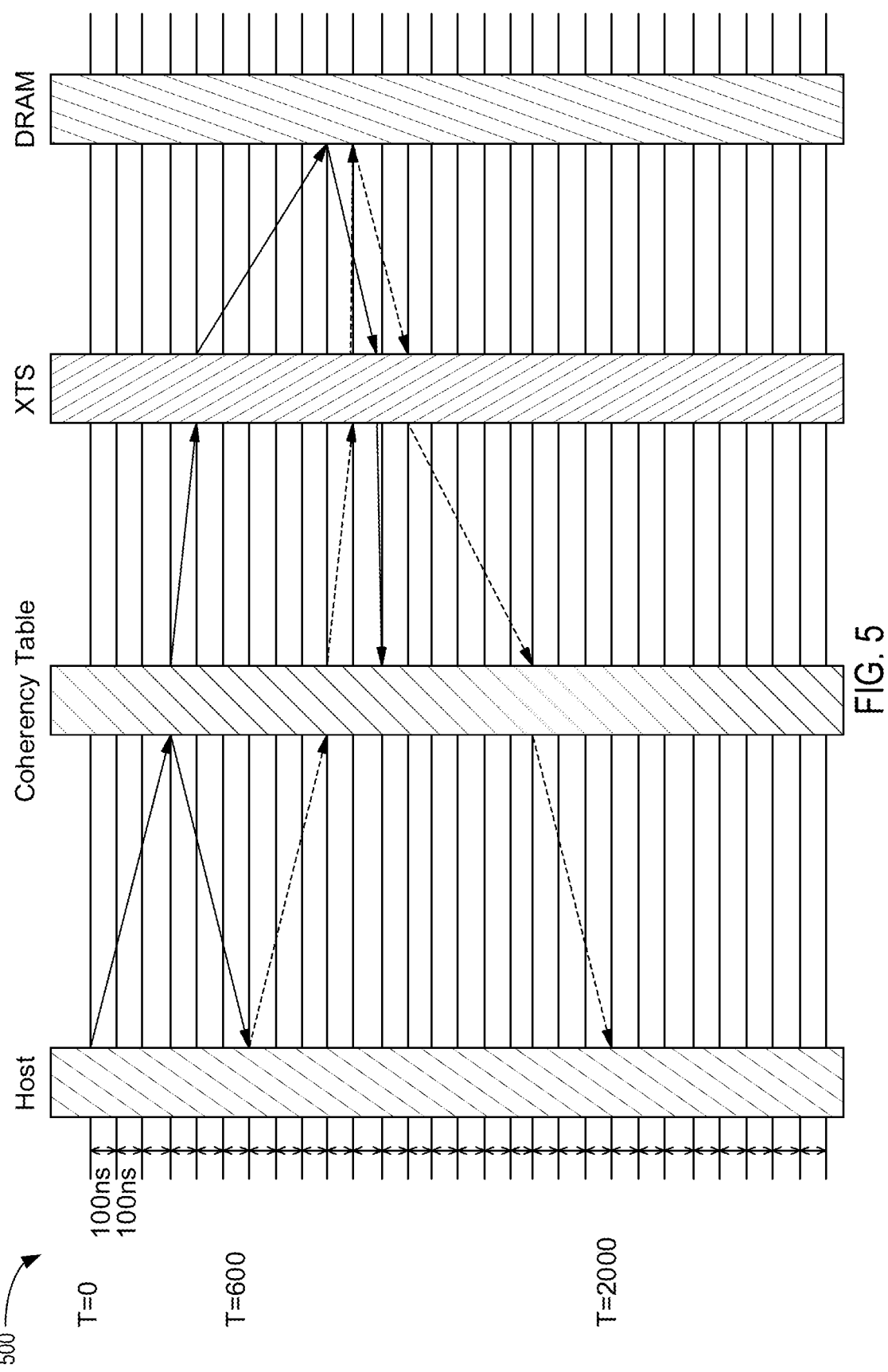
FIG. 5 is a block diagram illustrating a system for a write command followed by a non-overlapping read command, according to certain embodiments.

FIG. 5 is a block diagram illustrating a system 500 for a write command followed by a non-overlapping read command, according to certain embodiments. The system 500 is separated in 100 ns increments, and much like FIG. 3, the numbers are merely examples. The start of the write command, represented by a solid line, which moves across the PCIe bus in 300 ns. As soon as the command arrives to the coherency table, a response is sent to the host that takes 300 ns. Finishing the write command, the coherency table stores the write command address. The coherency table passes the data to the XTS module in 100 ns. The XTS module passes the data to the DRAM controller, which passes the data to the DRAM in 500 ns. The DRAM controller passes the data to the XTS module in 200 ns and informs the coherency table that the data is written. The coherency table clears the relevant write address.

The read command, represented by the dash line, starts at the completion of the response. The read command starting at 600 ns, passes the read command over the PCIe in 300 ns. The coherency table checks to see that there are no coherency issues in 100 ns, and passes the read command to the DRAM controller. The data is returned from the DRAM to the XTS module in 200 ns. The data reaches the coherency table in 500 ns after decryption. The data returns to the host from the coherency table in 300 ns. The read command finishes at in 2000 ns as opposed to finishing in 2600 ns, as shown in system 300.

Figure 6:
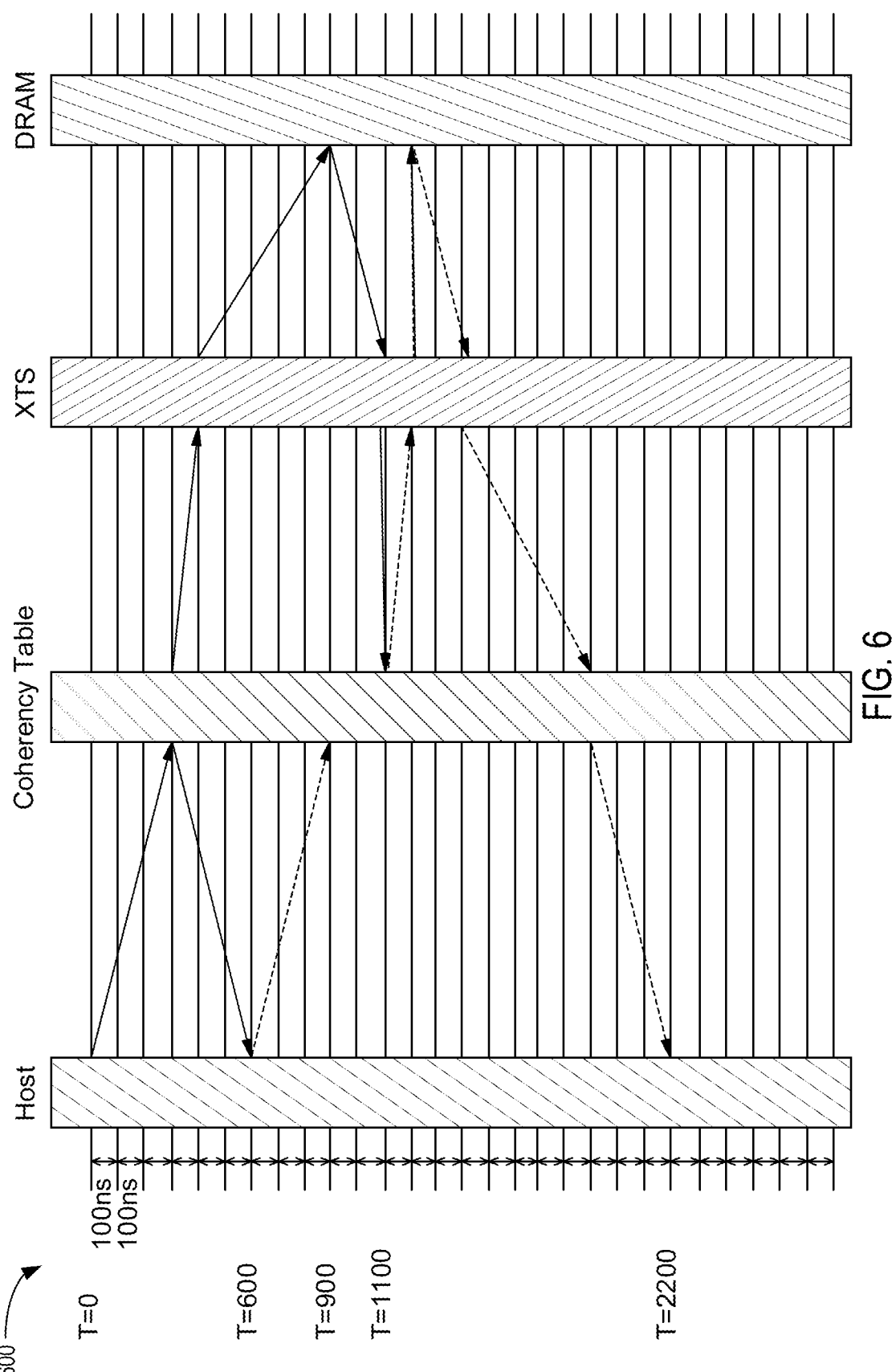
FIG. 6 is a block diagram illustrating a system for utilizing a coherency table during problem detection, according to certain embodiments.

FIG. 6 is a block diagram illustrating a system 600 for utilizing a coherency table during problem detection, according to certain embodiments. The system 600 is separated in 100 ns increments and as above, the numbers are merely an example. The write command, represented by the solid line, behaves the same as in the system 500. The read command starts at 600 ns and goes over the PCIe to the coherency table in 300 ns. At this point the data gets delayed in the coherency table for 200 ns, until the relevant entry is released in the write flow to the XTS module in 100 ns. From there the read command continues as in system 500, to finish in 2200 ns. Even though a pipeline is added (coherency table), the fact that the host can start the read much sooner improves the overall latency of the system 600. Performance is also improved in case a collision occurs.

In the original system 300, the read start beings at 1300 ns and the read response completes at 2600 ns. In a no coherency case the read starts at 600 ns and the read response completes in 2000 ns, saving system 500 400 ns in comparison to system 300. In a coherency case where a problem is detected, the read starts at 600 ns and the read response completes in 2200 ns, which is still 400 ns faster than system 300.

Figure 7:
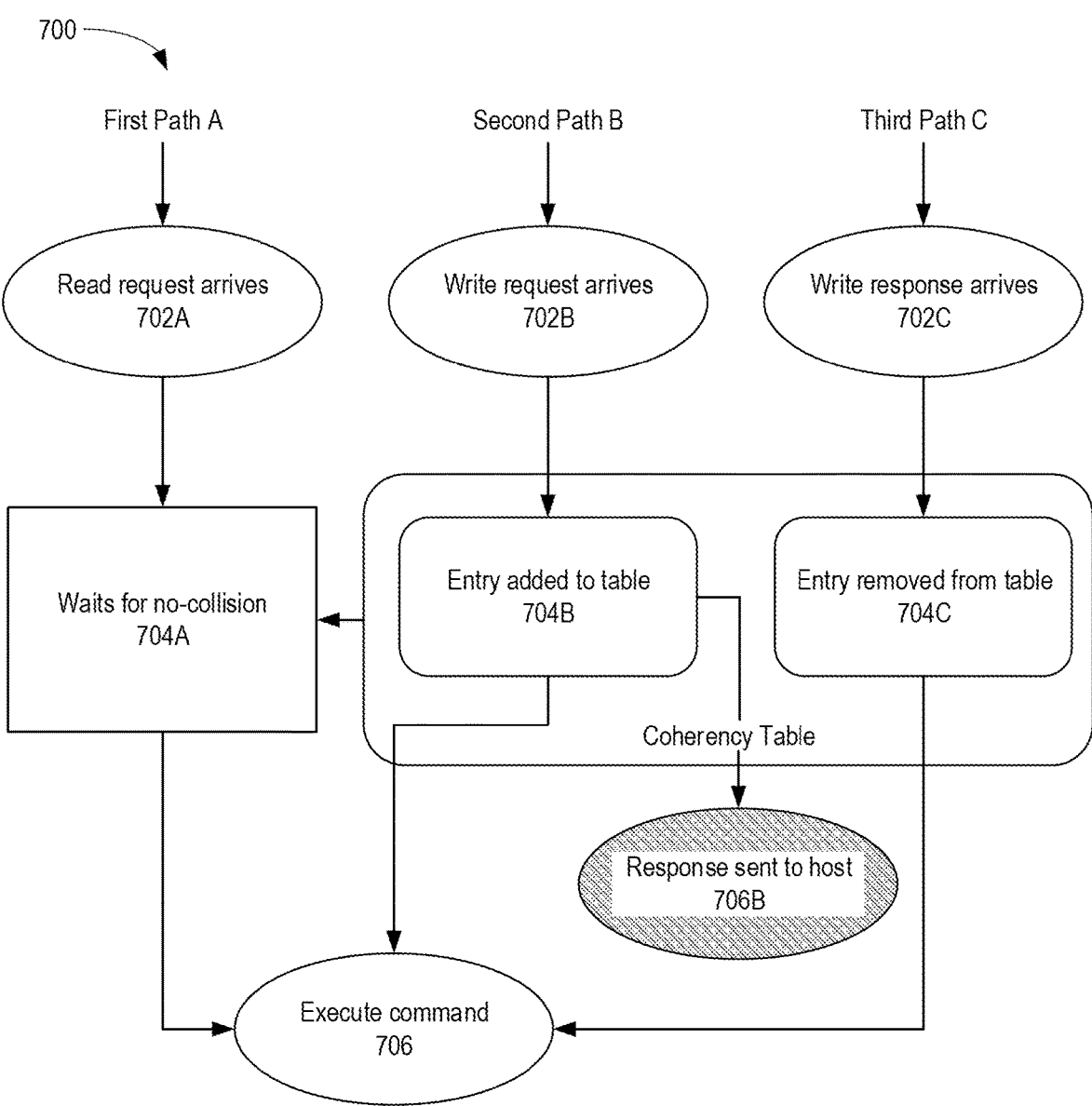
FIG. 7 is a flowchart illustrating a method for utilizing a coherency table, according to certain embodiments.

FIG. 7 is a flowchart illustrating a method 700 for utilizing a coherency table, according to certain embodiments. Using path A, the method 700 starts at block 702A. At block 702A, the controller receives a read request. The controller checks (and waits if needed) until there is no coherency collision. At block 704A, the controller waits for no-collision. At block 706, the controller executes the command.

Using path B, the method 700 starts at block 702B. At block 702B, the controller receives a write request. At block 704B, the controller adds an entry to the coherency table. The method 700 will proceed to both block 706 and block 706B. The command will continue towards the DRAM. At block 706B, the controller will send a response to the host.

Using path C, the method 700 starts at block 702C. At block 702C, the controller receives a write response indicating data is written in the DRAM. At block 704BC, the controller removes an entry from the coherency table. The method 700 will proceed to both block 706 to execute the command.

FIG. 8 is a flowchart illustrating a method 800 for processing a command utilizing a coherency table, according to certain embodiments. The method 800 begins at block 802. At block 802, the controller receives a write command. At block 804, the controller enters corresponding write address in a coherency table and responds to host that the write command is received. The process then proceeds down parallel paths as blocks 806 and 810a. At block 806, the controller sends data to an encryption module. At block 808, the controller sends data to a memory device. At block 810b, the write address is cleared from the coherency table. At block 810a, the controller receives a read command. At block 812, the controller performs a coherency check. At block 814, the controller determines whether there are any issues. If the controller determines that there are issues, then the method 800 proceeds to block 816. At block 816, the controller delays until relevant entry is released from coherency table as done at block 810b. At block 818, the controller determines whether a relevant entry was released. If the controller determines that there is not a relevant entry released, then the method 800 returns to block 816. If the controller determines that there is a relevant entry released, then the method 800 proceeds to block 824.

If the controller determines that there are no issues, then the method 800 proceeds to block 820. At block 822, the controller reads data from the memory device. At block 824, the controller decrypts the data. At block 826, the controller sends data to a host.

The advantage of utilizing the coherency table is that the coherency provides a better latency to the host for control information in a coherency sensitive environment. The coherency table allows for a faster execution of commands and reduces a host delay between writes and reads.

In one embodiment, a data storage device comprises: a memory device; and a controller coupled to the memory device, wherein the controller is configured to: receive a write command to write data to the memory device; pass the write command to a coherency table; receive a read command for different data; pass the read command to the memory device; and clear a relevant write address from the coherency table, wherein the clearing occurs after the passing the read command, due to writing the write data to DRAM. The controller is configured to delay passing the read command until after the clearing has occurred. The controller is configured to send a response to a host device after the passing the write command to the coherency table. The controller is further configured to store a write command address for the write command in the coherency table. The controller is further configured to pass the data to a data encryption/decryption module. The controller is further configured to pass the data to the memory device, wherein the memory device is volatile memory. The controller is further configured to inform the coherency table that the data has been written. Informing occurs after the passing the read command. The data is returned from the memory device to the data encryption/decryption module prior to the informing. The controller is further configured to detect an overlap of entries prior to passing the read command.

In another embodiment, a data storage device comprises: a memory device; and a controller coupled to the memory device, wherein the controller is configured to: receive a write command to write data to the memory device; receive a read command for the data; delay the read command at a coherency table; clear a relevant write address from the coherency table; and pass the read command to the memory device, wherein the passing occurs after the clearing. The controller comprises: a volatile memory controller; a data encryption/decryption module; and the coherency table. The memory device is coupled to the volatile memory controller. The memory device is dynamic random access memory (DRAM). A non-volatile memory device coupled to the controller. The clearing occurs after the data has been written to the memory device. The controller is configured to detect a collision at the coherency table prior to the delaying.

In another embodiment, a data storage device comprises: means to store data; and a controller coupled to the means to store data, wherein the controller is configured to: receive a write command for data to be written to the means to store data; receive a read command for the data; add an entry to a coherency table for the write command; wait for there to be no collision at the coherency table; and execute the read command. The controller is further configured to inform a host device that the entry has been made to the coherency table. The read command is received after the informing.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      receive a write command to write data to the memory device;
      pass the write command to a coherency table;

send a notification to a host device responsive to passing the write command to the coherency table;
      store an address for the write command in the coherency table;
      receive a read command for data, wherein the read command is received from the host device responsive to the host device receiving the notification;
      pass the read command to the coherency table; and
      clear the address from the coherency table, wherein the clearing occurs after passing the read command to the coherency table.

2. The data storage device of claim 1, wherein the controller is configured to delay passing the read command from the coherency table to a data encryption/decryption module until after the clearing has occurred when data associated with the read command overlaps with data associated with the write command.

3. The data storage device of claim 1, wherein the controller is further configured to pass the read command from the coherency table to a data encryption/decryption module.

4. The data storage device of claim 3, wherein the controller is further configured to pass the data to the memory device, wherein the memory device is volatile memory.

5. The data storage device of claim 4, wherein the controller is further configured to inform the coherency table that the data has been written.

6. The data storage device of claim 5, wherein informing occurs after the passing the read command.

7. The data storage device of claim 6, wherein the data is returned from the memory device to the data encryption/decryption module prior to the informing.

8. The data storage device of claim 4, wherein passing the read command from the coherency table occurs prior to clearing the address from the coherency table when data associated with the read command is non-overlapping data relative to data associated with the write command.

9. The data storage device of claim 1, wherein the controller is further configured to detect an overlap of entries prior to passing the read command.

10. The data storage device of claim 1, wherein the clearing of the address from the coherency table occurs based writing the write command to the memory device.

11. A data storage device, comprising:
   means to store data; and
   a controller coupled to the means to store data, wherein the controller is configured to:
      receive a write command for data to be written to the means to store data, wherein executing the write command comprises:
         adding an entry to a coherency table for the write command;
         writing the data to the means to store data; and
         clearing the entry from the coherency table after completing the writing of the data to the means to store data;
      receive a read command for the data;
      pass the read command to the coherency table prior to clearing the entry from the coherency table;
      wait for there to be no collision at the coherency table; and
      after the waiting, pass the read command from the coherency table to the means to store data after the clearing of the entry from the coherency table, wherein the controller is further configured to inform a host device that the entry has been made to the coherency table, wherein the read command is sent from a host device responsive to the informing.

* * * * *